ated Oct. 17, 1967

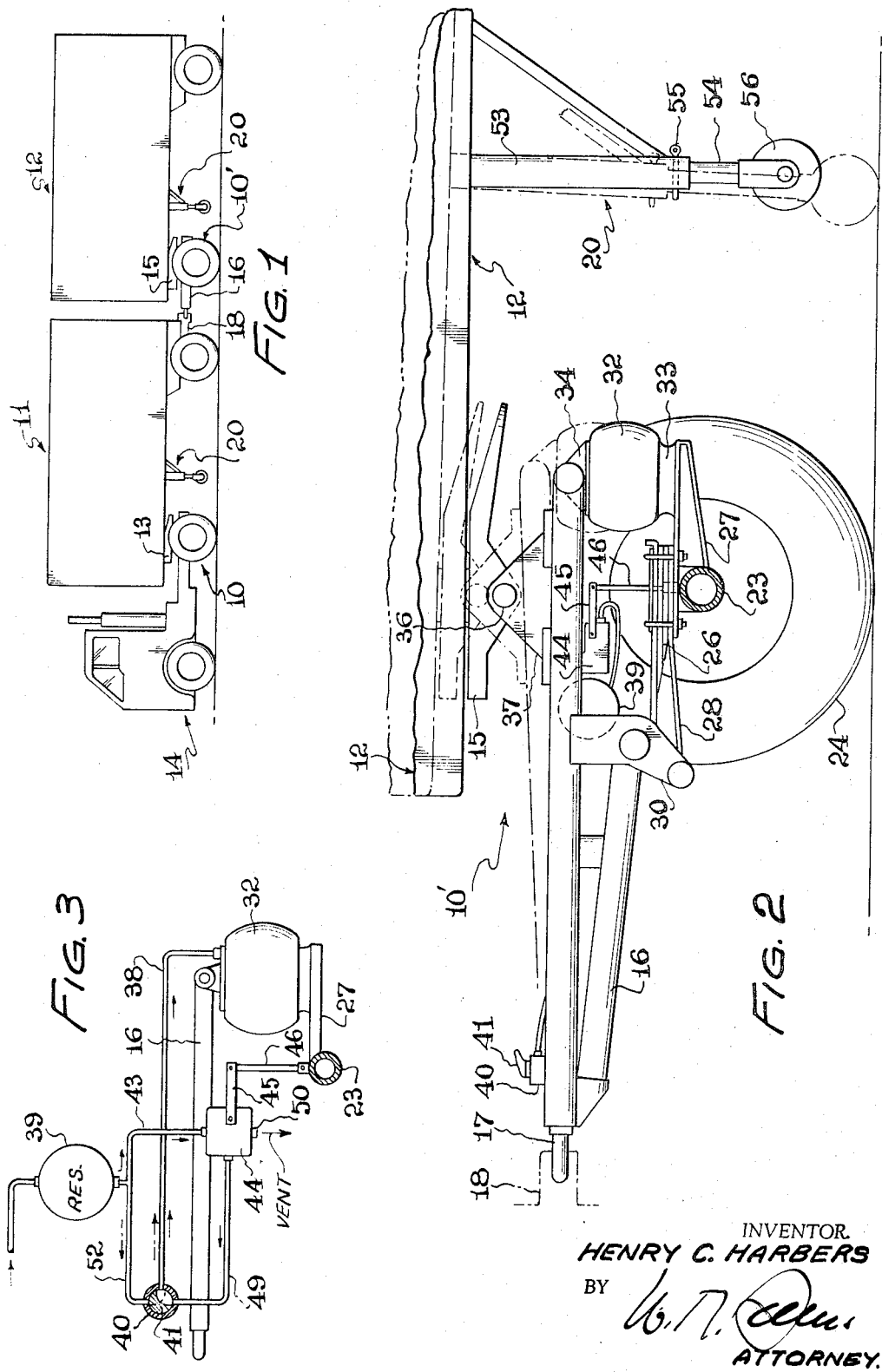
Oct. 17, 1967    H. C. HARBERS    3,347,563
FIFTH-WHEEL ELEVATING AND LEVEL CONTROLLING
AIR JACK FOR SEMI-TRAILER DOLLIES
Filed Oct. 23, 1965
INVENTOR.
HENRY C. HARBERS
BY
ATTORNEY.

United States Patent Office 3,347,563

3,347,563
FIFTH-WHEEL ELEVATING AND LEVEL CONTROLLING AIR JACK FOR SEMI-TRAILER DOLLIES

Henry C. Harbers, Pasadena, Calif., assignor to Western Unit Corporation, City of Industry, Calif., a corporation of California
Filed Oct. 23, 1965, Ser. No. 502,901
4 Claims. (Cl. 280—425)

ABSTRACT OF THE DISCLOSURE

This invention relates to the construction and operation of equipment used in connection with semi-trailers and more particularly to means for deactivating the constant level control for air springs employed in the suspension assembly for the fifth wheel unit while using the air springs proper to raise and lower the front end of the trailer to facilitate operation of the support strut of such trailers. The invention equipment utilizes a multiple position valve to control deactivation of the constant level control as well as the venting of air from the air springs to permit lowering of the trailer onto the support strut.

---

It has long been customary practice to equip semi-trailers with mechanical strut means normally held in a retracted position while the trailer is in a travel status and capable of being lowered to support the forward end of the trailer during loading, unloading and storage operations. Such supporting struts are customarily equipped with manually operable means for extending and retracting them.

A wide assortment of devices have been proposed heretofore for extending and retracting such struts but many of these include mechanical jack means enabling workmen to operate them in either direction and effective to raise even a loaded trailer sufficiently to permit the fifth wheel to be uncoupled from the trailer. Such operating equipment for the strut usually requires great effort on the part of the workman, particularly when the trailer is loaded. Furthermore the workman is often required to operate the strut under extremely adverse conditions necessitating his going through mud, pools of water, snow, ice, slush and the like, hazardous to life and limb.

The present invention is designed to avoid these and other serious objections and disadvantages of prior equipment of the type referred to. More specifically the invention provides simple, highly effective means utilizing part of the equipment normally present on the truck and performing other functions and to utilize this equipment as a power jack to elevate the forward end of the trailer while the mechanical strut, free of any loading, is being raised and lowered.

For example, conventional hauling equipment is customarily provided with air springs in association with constant height level control means and functioning to provide a soft ride for the equipment whether traveling loaded or empty. By simple easily-operated auxiliary means associated with this constant level device, the equipment operator is enabled to deactivate the normal functioning of the constant level control and to utilize pressurized air to expand the air spring sufficiently to elevate the forward end of the trailer and to hold it there while raising and lowering the mechanical strut. After the strut has been either extended or returned to its retracted position, the auxiliary equipment is restored to its customary operating condition. If desired, the control for the jack can be located in the driver's compartment and the air jack can be operated in both directions while the driver remains at his driving station.

Accordingly it is a primary object of the present invention to provide a simple, easily-operated power jack for supporting the forward end of a semi-trailer in an elevated position while the customary strut therefor is being operated between its extended and retracted positions.

Another object of the invention is the provision of a spring suspension assembly for the forward end of a semi-trailer featuring means for deactivating the constant level valve therefor and utilizing the same in combination with the air spring portion of the suspension to hold the semi-trailer elevated temporarily.

Another object of the invention is the provision of a converter dolly assembly for use in supporting the forward end of a semi-trailer and including air spring means operable to support the fifth wheel of the converter assembly in an elevated position at certain times and in a normal traveling position at other times.

Another object of the invention is the provision of a manually controlled air jack for use with the forward end of semi-trailers to temporarily elevate a trailer as an incident to coupling and uncoupling the same from a fifth wheel unit.

These and other more specific objects will appear upon reading the following specification and claims and upon considering in connection therewith the attached drawings to which they relate.

Referring now to the drawings in which a preferred embodiment of the invention is illustrated, FIGURE 1 is a side elevational view of a truck train utilizing two semi-trailers connected in tandem to a hauling tractor.

FIGURE 2 is a fragmentary side elevational view, partly in section, taken through the converter dolly assembly of the rearmost semi-trailer; and FIGURE 3 is a schematic showing of the pneumatic circuit for the air jack.

Referring to the drawing showing one preferred embodiment of the invention as incorporated in a carriage suspension assembly, designated generally 10, and supporting the forward ends of the separate semi-trailers 11 and 12, forward semi-trailer 11 is shown supported on the fifth wheel 13 of a tractor unit 14 whereas rearmost trailer 12 is supported on a fifth wheel unit 15 of a converter dolly assembly 10'. The latter is provided with a combination main frame and hauling tongue 16 having an eye 17 coupled to clevice 18 of trailer 11. Each of the trailers is also provided with any suitable mechanical strut assembly such as that indicated at 20.

Referring now more particularly to FIGURE 2 it is pointed out that converter dolly unit 10' has a carriage axle 23 supported by a pair of carriage wheels 24. This axle is resiliently coupled to frame 16 through resilient suspension means including a spring beam 26 rigidly clamped to axle 23, and a rigid rearwardly projecting cantilever beam 27 supporting an air spring 32. Spring beam 26 includes a radius connection such as a spring leaf 28 having its forward end connected to a pin crosswise of the lower end of a spring hanger 30 rigidly connected to main frame 16. Air spring 32 is interposed between the rear end of frame 16 and the rear end of cantilever beam 27. The lower end of the bellows forming the expandable component of the air spring is connected to beam 27 by a bracket 33 and its upper end is connected to frame 16 by a bracket 34. The upper side of the dolly frame 16 is detachably connected to the forward end of the semi-trailer by any suitable fifth wheel 15 movably coupled to frame 16 by a transverse pivot shaft 36 having its ends channeled in brackets 37 and fixed to frame 16.

Air spring 32 is supplied with pressurized air through a conduit 38 (FIGURE 3) connected to an air storage tank 39 through a valve 40, here shown as mounted at the forward end of frame 16. However it will be understood that this valve may be located in the driver's compartment of tractor 14 or at any other convenient operating point. Valve 40 includes a manually rotatable cock member 41 having two principal operating positions here shown spaced 90 degrees apart. When the valve is positioned as shown in FIGURE 3, the cargo train is conditioned for normal travel over the highway. Pressurized air from storage tank 39 then flows through conduit 43 into the top of the constant level valve 44 of any well known construction. This valve is rigidly secured to frame 16 and includes a vertically pivotable operating lever 45, the outer free end of which is connected through link 46 with carriage axle 23. When positioned as shown in FIGURES 2 and 3, pressurized air cannot escape from air spring 32. If the loading on the air spring increases so as to compress the air bellows, arm 45 is thereby caused to pivot counterclockwise allowing additional pressurized air to flow from reservoir 39 through conduit 43, valve 44, conduit 49, valve 41 and conduit 38 into the air spring. Additional air expands the air spring restoring the normal or neutral position of control lever 45 in which valve 44 is closed.

If the loading is removed, the air spring expands causing control lever 45 to pivot clockwise thereby permitting air to escape from the air spring to the atmosphere through conduit 38, valve 41, conduit 49, and vent port 50 on the underside of valve 44. As the air escapes, the air spring contracts restoring control lever 45 to its horizontal neutral position and closing the valve.

Let it now be assumed that the operator wishes to park semi-trailer 12 and to proceed with the rest of the train to another point. To do so, he first parks trailer 12 in a selected position and then rotates control valve 40 90-degrees counterclockwise from the position shown in FIGURE 3. This cuts off the air inlet to conduit 49 so that no air can escape to the atmosphere. At the same time air can flow through conduit 52, valve 41 and conduit 38 into air spring 32 causing the air spring to expand upwardly elevating the forward end of trailer 12 by a suitable amount, as 3 inches above its normal traveling position. Valve 41 can then be rotated further counterclockwise to lock air spring 32 in its expanded condition while the driver manipulates the mechanical strut 20 to lower it into contact with the ground, it being understood that the strut includes an upwardly rigidly supported member 53 and a vertically adjustable lower member 54 held locked in any desired adjusted position as by a lock pin 55. Desirably the lower end of member 54 is provided with a roller 56.

To reconnect the converter dolly to the trailer, the operator first backs the converter into position beneath the elevated front end of the trailer. Valve 41 is then operated to elevate the fifth wheel by expansion of air spring 32, the trailer being lifted sufficiently in this manner to remove the weight from strut assembly 20. Member 54 and roller 56 are then retracted and pin 55 is returned to its seated position to lock the strut retracted. Thereafter valve 41 is restored to the position shown in FIGURE 3 and the air spring allowed to resume its normal operating position in the same manner described above.

It is to be understood that tractor unit 14 preferably includes air springs similar to those just described for the converter dolly along with a constant level valve mechanism and a control valve therefor, all as described above in connection with converter dolly 10. These components operate precisely in the same manner just described to lift the front end of trailer 11 while extending and retracting its temporary strut 20.

While the particular cargo vehicle with air jack herein shown and disclosed in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. In a semi-trailer of the type having the rear end supported by a rear carriage assembly and having vertically adjustable strut means for supporting the front end thereof when not supported on front carriage means; that improvement which comprises carriage means for supporting the front end of said trailer while in a travel status, said front carriage means including air spring suspension means for imparting a soft ride to the front end of said trailer, pressurized air reservoir means for supplying pressurized air to said air spring means and including automatic constant level valve means responsive to changing load conditions to vary the air pressure in said air spring means to provide a soft ride for the prevailing loading then acting on said front carriage means, manually operable valve means including air conducting passages connected between said reservoir and said air spring means, said manual valve means being normally so positioned that said constant level valve means controls the operation of said air spring means, and said manual valve means being operable in another position thereof to deactivate said constant level means and to supply reservoir air to said air spring means to elevate the front end of said semi-trailer while said adjustable strut means is being extended, and said manual valve means being operable in another position thereof to allow pressurized air to escape to the atmosphere from said elevated air spring means thereby to lower said front carriage means downwardly away from supporting contact with the strut-supported front end of said semi-trailer.

2. A converter dolly assembly for use in supporting the front end of a semi-trailer, said assembly having a carriage, a fifth wheel unit supported on said carriage by resilient suspension means including air spring means, draft tongue means attached to said assembly adapted to be connected to a forward vehicle, a reservoir charged with pressurized air and having connections to supply air to said air spring means, valve means controlling the flow of air from said reservoir to said air spring means and operable in one position to supply air to said air spring means to elevate said fifth wheel substantially above the normal highway travel position thereof while hauling a semi-trailer thereby to elevate the front end of a trailer while its supporting strut is being lowered into contact with the roadway free of loading and locked in this extended position, and said valve means then being operable to a second position to release air from said air spring means until the trailer front end is supported entirely on its extended strut means and free of contact with said converter dolly assembly thereby releasing said dolly assembly for withdrawal from beneath the trailer, said air connections between said reservoir and said air spring means including automatic constant level valve means normally operating to provide a soft ride for the front end of a trailer supported thereon over a wide range of loading, and said first mentioned valve means including means for supplying pressurized air to said spring means independently of said constant level valve means and being operable in one position thereof to employ pressurized air from said reservoir to elevate said air spring means substantially above the normal position of said air spring means under the existing load conditions on said air spring means.

3. A converter dolly assembly as defined in claim 2 characterized in that said first mentioned valve means being located in said air supply connections at a point between said air spring means and said constant level valve means and including independent supply connections to said air reservoir and a vent to the atmosphere, and said first mentioned air valve means being adjustable to one of three positions in one of which air is supplied to said air spring means independently of said constant level valve means, and in a second of which air from said air spring means is vented to the atmosphere and in a third of which air is supplied to and vented from said air spring means under the control of said constant level valve means.

4. A converter dolly assembly as defined in claim 2 characterized in that said first mentioned valve means is mounted on said draft tongue means in a position conveniently accessible to an operator preparing to attach and/or detach a dolly beneath a semi-trailer.

References Cited

UNITED STATES PATENTS

| 2,733,931 | 2/1956 | Reid et al. | 280—425 |
| 2,997,314 | 8/1961 | Hill et al. | 280—124 |
| 3,209,784 | 10/1965 | Schwartz | 137—627.5 |
| 3,214,185 | 10/1965 | Mason et al. | 280—124 |
| 3,253,840 | 5/1966 | Granning | 280—425 |

FOREIGN PATENTS

| 211,871 | 6/1956 | Australia. |
| 959,026 | 5/1964 | Great Britain. |

LEO FRIAGLIA, *Primary Examiner.*